No. 647,627. Patented Apr. 17, 1900.
D. GILMOUR.
MANUFACTURE OF LUMBER.
(Application filed July 27, 1899.)

(No Model.)

Attest
F. L. Middleton
Henry E. Cooper

Inventor
David Gilmour
by Fetherstonhaugh & Co
Attys

UNITED STATES PATENT OFFICE.

DAVID GILMOUR, OF TRENTON, CANADA.

MANUFACTURE OF LUMBER.

SPECIFICATION forming part of Letters Patent No. 647,627, dated April 17, 1900.

Application filed July 27, 1899. Serial No. 725,315. (No specimens.)

*To all whom it may concern:*

Be it known that I, DAVID GILMOUR, a subject of the Queen of Great Britain, residing at Trenton, Province of Ontario, Canada, have invented certain new and useful Improvements in the Manufacture of Lumber, of which the following is a specification.

My invention relates to the manufacture of lumber composed of a body or backing of inferior, defective, or low-grade material and a surface of high-grade, clear, or better material.

The increasing scarcity and cost of high-grade clear lumber are well known. As the forests are worked year by year the higher grades are more and more culled out, and while an abundance remains of low-grade defective material there is a prospect of insufficient supply of the best material for lumber.

The object of my invention is to utilize the low-grade material in the manufacture of high-grade lumber and to produce a practically high-grade lumber as good as or better than the "good," "clear," "picks," and "selects" of the market at less cost. This I have already begun on a commercial scale.

My invention includes the joining of the two parts of the lumber, one of high-grade or better material and the other of low-grade or cheaper or different material, by means of tongue-and-grooved connections; and my invention consists in a special modification, as hereinafter described.

Surfacing of lumber by means of tongues and grooves has heretofore been suggested; but so far as I am aware after an extensive experience in the practical manufacture of lumber this device has not been heretofore put into practical use. The reason of this lies in the difficulty heretofore experienced in producing such lumber with the parts firmly united, compact, and finished, and free from warping or splitting.

To accomplish the object of my invention and to produce a merchantable article at reasonable cost and properly finished, I have discovered that it was necessary to compress the surface layer in the manufacture of the article. To do this on a commercial scale and in a practicable manner, I have devised a new process, which is made the subject of another application filed in the United States Patent Office of even date herewith.

My invention herein set forth consists of the article of manufacture, as hereinafter described. This is illustrated in the accompanying drawings, in which—

Figure 1:
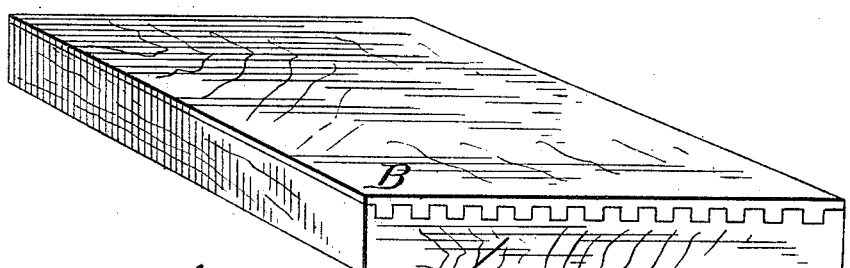
Figure 2:
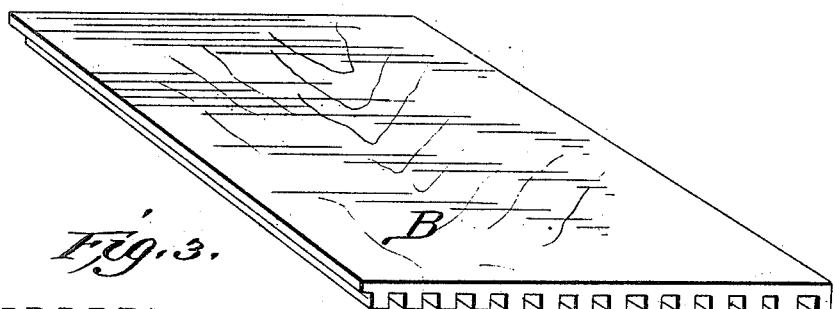
Figure 3:
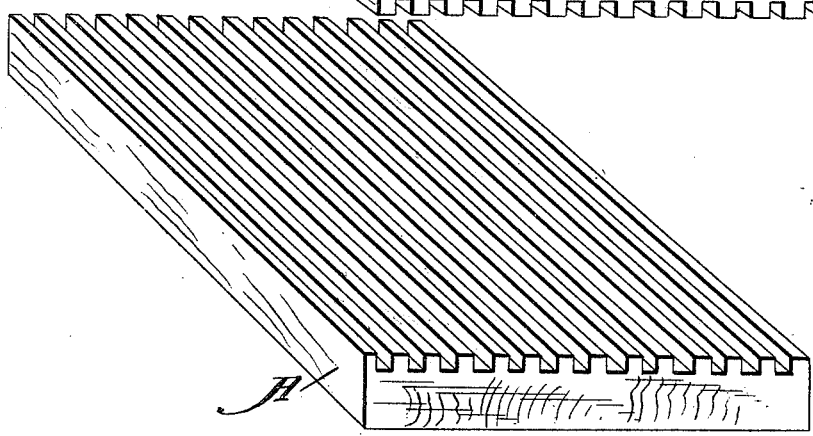

Figure 1 is a perspective view of the finished product. Fig. 2 is a like view of the surface part, and Fig. 3 a perspective view of the body part.

In the drawings, A represents the foundation or thicker part of a finished board representing the invention. It may be of any low-grade lumber taken directly from the forest or from the comparatively-refuse material from the mills, whether knotty, shaky, worm-eaten, or otherwise imperfect. This is formed into boards in any suitable way and is then run through any machine suited to form thereon tongues and grooves, preferably rectangular in cross-section and substantially in proportion as shown—that is, with comparatively-fine tongues and grooves.

The surfacing material B is made thin and of higher grade of lumber and is tongued and grooved to fit the part A. I may thus tongue and groove this part while it is still warm and moist from the vat. After the two parts are thus tongued and grooved their tongued and grooved surfaces (one or both) are coated with glue or cement, preferably waterproof, which may be applied by suitable brushes, and the two parts are then placed together. I then run them horizontally of the grain between heated rollers under strong pressure sufficient not only to press together the tongue-and-grooved parts, but also to compress the surface material and to drain out longitudinally of the grain all the moisture and surplus glue or cement and to leave the thin layer compressed and condensed and dry and hard and with a finished surface. This obviates the necessity of further drying and the liability of warping or cracking or of the outer layer springing in the drying from its base and makes a hard smooth-finished surface, and the lumber may be either at once solidly stacked or shipped. As a matter of course the pressure which condenses and smooths the part B at the same time firmly unites the parts and by the aid of the heat expels the moisture. It will be understood that this pressure is not simply to force the parts into contact, which is ordinary work, but is such as to cause the wood to flow laterally under the compression of the fibers throughout the part B and the tongues of part A and to weld and unite the tongues together on all their surfaces in contact, and thus also the fibers of the wood are thoroughly condensed.

I claim—

As a new article of manufacture, compound lumber comprising tongue-and-grooved high and low grade interlocking pieces simultaneously rolled and compressed, heated and finished with the surface pores closed as specified.

In testimony whereof I affix my signature in presence of two witnesses.

DAVID GILMOUR.

Witnesses:
 HENRY E. COOPER,
 C. S. MIDDLETON.